C. BEVILL.
PLANT SHIELD.
APPLICATION FILED JULY 14, 1910.
1,011,017.
Patented Dec. 5, 1911.
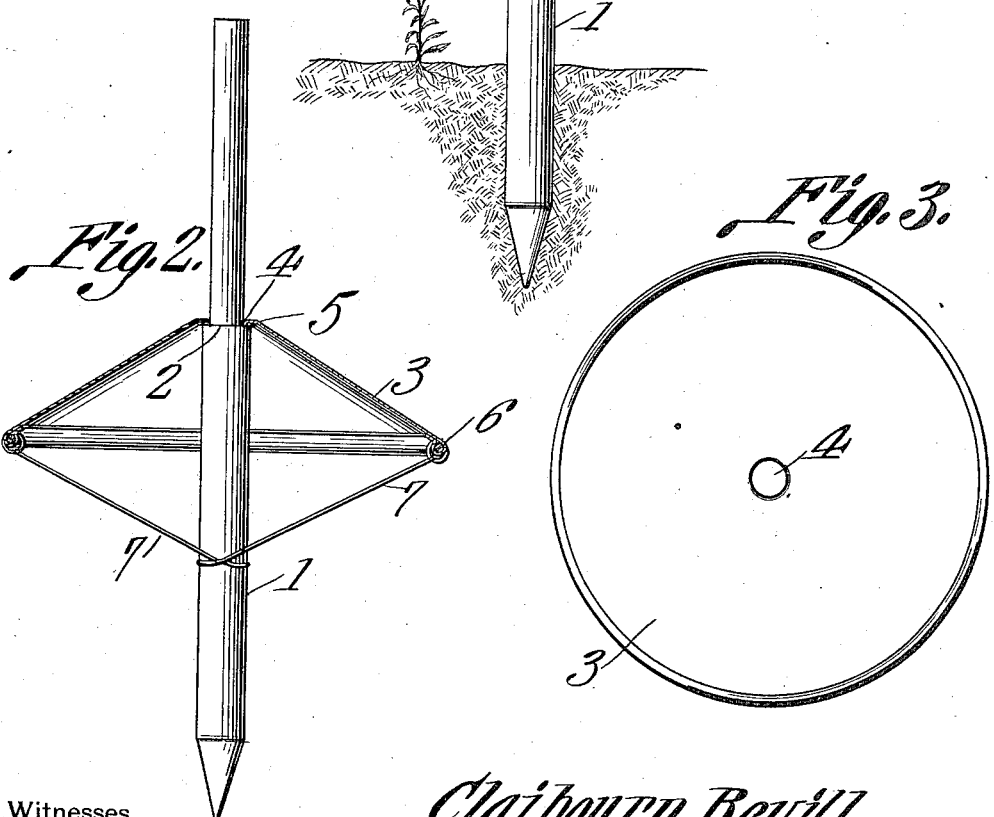

UNITED STATES PATENT OFFICE.

CLAIBOURN BEVILL, OF BUSHNELL, FLORIDA.

PLANT-SHIELD.

1,011,017.  Specification of Letters Patent.  Patented Dec. 5, 1911.

Application filed July 14, 1910. Serial No. 571,953.

*To all whom it may concern:*

Be it known that I, CLAIBOURN BEVILL, a citizen of the United States, residing at Bushnell, in the county of Sumter and State of Florida, have invented a new and useful Plant-Shield, of which the following is a specification.

This invention relates to shields for protecting young plants from frosts and heavy rains and one of its objects is to provide a simple and inexpensive device of this character which can be readily placed in position, and which, when not in use, can be compactly stored.

A further object is to provide a shield which can be easily adjusted to a desired position relative to its support.

With these and other objects in view the invention consists in certain novel details of construction and combinations of parts hereinafter more fully described and pointed out in the claim.

In the accompanying drawings the preferred form of the invention has been shown.

In said drawings, Figure 1 is an elevation of the shield, the same being shown in position to protect a plant. Fig. 2 is a vertical section through the shield, the supporting stake being shown in elevation. Fig. 3 is a top plan view of the hood portion of the shield.

Referring to the figures by characters of reference 1 designates a supporting stake of any desired length and which is preferably provided, at an intermediate point, with an annular shoulder 2 which may be produced by reducing the diameter of one end portion of the stake. This shoulder 2 is adapted to support a substantially conical hood such as shown at 3, said hood being formed of cloth or any other desired material and having an opening 4 in the apex portion thereof, the diameter of this opening being substantially the same as the diameter of the reduced end portion of the stake 1. The material constituting the hood can be folded back at the opening 4 so as to reinforce the hood, this folded portion being shown at 5. The margin of the hood is secured to a wire ring 6 or the like and a number of cords 7 are attached to this margin and are adapted to be tied or otherwise secured to the stake at a point below the hood so as to hold the said hood against movement relative to the stake. It is to be understood that a large number of these hoods can be bundled together and thus be stored in a small space while not in use.

When it is desired to utilize the shield for the purpose of protecting a plant, the hood portion 3 of the shield is placed upon the stake and moved along until the shoulder 2 comes into contact with the apex portion of the hood. The cords 7 are then tied to the stake at a point below the hood and they can be adjusted so as to hold the hood at any desired angle relative to the stake. After the parts have thus been secured together, the pointed end of the stake can be forced into the ground close to the plant so as to cause the hood to extend over the plant. The shield which has been described can be left over the plant until the same grows to such a height as to make necessary the removal of the shield.

It is to be understood that the hood may be angular instead of circular in cross sectional contour and the word "ring" as used with reference to the part 6 applies to said part whether the same be circular or angular or of any other desired shape.

It will be noted that the cords 7 employed for adjusting the hood relative to the supporting stake are located entirely under the hood where they are protected at all times by the hood.

It is to be understood of course that various changes can be made in the construction and arrangement of the parts without departing from the spirit or sacrificing any of the advantages of the invention as defined in the appended claim.

What is claimed is:—

A plant shield including a stake having a reduced upper end portion forming an annular shoulder between the ends of the stake, a conical hood having an opening in the apex portion thereof, the diameter of the opening being substantially the same as the diameter of the reduced end portion of the stake, said hood being movable against and adapted to be supported by the shoulder, a ring housed in the marginal portion of the hood and constituting stiffening means, and separate cords secured to the ring at diametrically opposed points and extending under the hood, said cords constituting means for detachably and adjustably engaging the stake and holding the hood at any predetermined angle relative to the stake.

In testimony that I claim the foregoing as my own, I have hereto affixed my signature in the presence of two witnesses.

CLAIBOURN BEVILL.

Witnesses:
I. H. HAYS,
W. F. NOBLE.

Copies of this patent may be obtained for five cents each, by addressing the "Commissioner of Patents, Washington, D. C."